(12) United States Patent
Nammi et al.

(10) Patent No.: US 11,949,505 B2
(45) Date of Patent: Apr. 2, 2024

(54) SCHEDULING OF UPLINK DATA USING DEMODULATION REFERENCE SIGNAL AND SCHEDULED RESOURCES

(71) Applicant: AT&T INTELLECTUAL PROPERTY I, L.P., Atlanta, GA (US)

(72) Inventors: SaiRamesh Nammi, Kista (SE); Arunabha Ghosh, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 18/296,406

(22) Filed: Apr. 6, 2023

(65) Prior Publication Data
US 2023/0246734 A1 Aug. 3, 2023

Related U.S. Application Data

(63) Continuation of application No. 17/187,933, filed on Mar. 1, 2021, now Pat. No. 11,652,569, which is a (Continued)

(51) Int. Cl.
*H04L 1/00* (2006.01)
*H04L 5/00* (2006.01)
(Continued)

(52) U.S. Cl.
CPC .......... *H04L 1/0026* (2013.01); *H04L 1/0003* (2013.01); *H04L 5/005* (2013.01); (Continued)

(58) Field of Classification Search
CPC ..... H04L 1/0026; H04L 1/0003; H04L 5/005; H04L 25/0226; H04L 5/0051;
(Continued)

(56) References Cited

U.S. PATENT DOCUMENTS

| 10,784,987 B2 | 9/2020 | Marinier et al. |
| 2012/0163334 A1 | 6/2012 | Miki et al. |
| 2014/0254492 A1* | 9/2014 | Noh ...................... H04L 5/0051 370/328 |

OTHER PUBLICATIONS

Non Final Office Action received for U.S. Appl. No. 16/442,295 dated Sep. 29, 2020, 20 pages.
(Continued)

*Primary Examiner* — Ayanah S George
(74) *Attorney, Agent, or Firm* — Guntin & Gust, PLC; Kenneth S. Kwan

(57) ABSTRACT

Various embodiments disclosed herein provide for facilitating scheduling of uplink data using demodulation reference signal and scheduled resources. According to an embodiment, a system can comprise configuring a network device with a periodic rate of specified sounding reference signals with a periodicity using radio resource control signaling. The system can further facilitate estimating channel state information associated with a channel via which the network device communicates. The system can further facilitate transmitting an uplink grant with uplink transmission parameters to set up a physical uplink shared channel, wherein the uplink transmission parameters are determined based on the channel state information. The system can further facilitate estimating scheduling parameters based on a first estimation information associated with the physical uplink shared channel.

20 Claims, 11 Drawing Sheets

Related U.S. Application Data continuation of application No. 16/442,295, filed on Jun. 14, 2019, now Pat. No. 10,972,214.

(60) Provisional application No. 62/806,631, filed on Feb. 15, 2019.

(51) Int. Cl.
    *H04L 25/02*     (2006.01)
    *H04W 72/23*     (2023.01)
    *H04W 76/27*     (2018.01)

(52) U.S. Cl.
    CPC ......... *H04L 25/0226* (2013.01); *H04W 72/23* (2023.01); *H04W 76/27* (2018.02)

(58) Field of Classification Search
    CPC . H04L 25/0224; H04L 1/0009; H04L 1/0025; H04L 1/0001; H04W 72/23; H04W 76/27
    See application file for complete search history.

(56) References Cited

OTHER PUBLICATIONS

Non Final Office Action received for U.S. Appl. No. 17/187,933 dated Oct. 5, 2022, 19 pages.
Notice of Allowance received for U.S. Appl. No. 17/187,933 dated Jan. 10, 2023, 20 pages.

* cited by examiner

SCHEDULING OF UPLINK DATA USING DEMODULATION REFERENCE SIGNAL AND SCHEDULED RESOURCES

RELATED APPLICATIONS

This application is continuation of, and claims priority to each of, U.S. patent application Ser. No. 17/187,933, filed Mar. 1, 2021, and entitled "SCHEDULING OF UPLINK DATA USING DEMODULATION REFERENCE SIGNAL AND SCHEDULED RESOURCES," which is a continuation of U.S. patent application Ser. No. 16/442,295 (now U.S. Pat. No. 10,972,214), filed Jun. 14, 2019, and entitled "SCHEDULING OF UPLINK DATA USING DEMODULATION REFERENCE SIGNAL AND SCHEDULED RESOURCES," which applications further claim the benefit of priority to U.S. Provisional Patent Application No. 62/806,631, filed Feb. 15, 2019 and titled "SCHEDULING OF UPLINK DATA USING DEMODULATION REFERENCE SIGNAL AND SCHEDULED RESOURCES," the respective entireties of which priority applications are hereby incorporated by reference herein.

TECHNICAL FIELD

This disclosure relates generally to a wireless communication system in general, and to a fifth generation (5G) wireless communication systems. More specifically, facilitating scheduling of uplink data using demodulation reference signal and scheduled resources in 5G wireless communication system.

BACKGROUND $5^{th}$ generation (5G) wireless systems represent a next major phase of mobile telecommunications standards, also called new radio (NR) access, beyond the current telecommunications standards of $4^{th}$ generation (4G). In addition to faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating scheduling of uplink data using demodulation reference signal and scheduled resources is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
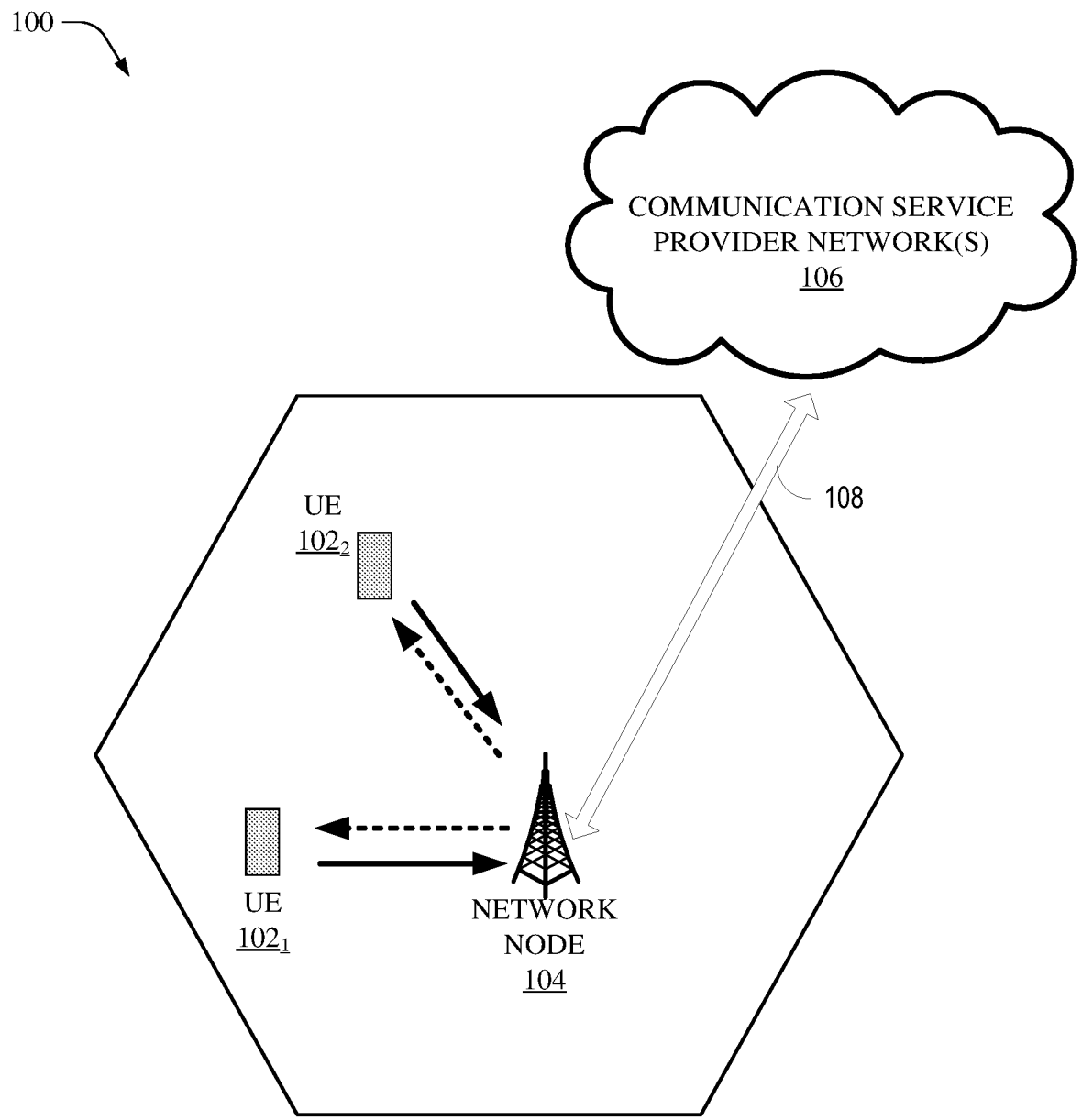
FIG. 1 illustrates a non-limiting example of a wireless communication system in accordance with various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate scheduling of uplink data using demodulation reference signal and scheduled resources. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate scheduling of uplink data using demodulation reference signal and scheduled resources. Facilitating a discontinuous access to unlicensed spectrum can be implemented in connection with any type of device with a connection to the communications network (e.g., a mobile handset, a computer, a handheld device, etc.) any Internet of things (JOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio, network node, or simply network node is used for gNB (e.g., 5G base-station). It can refer to any type of network node that serves UE is connected to other network nodes or network elements or any radio node from where UE receives a signal. Examples of radio network nodes are Node B, base station (BS), multi-standard radio (MSR) node such as MSR BS, gNB, eNode B, network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), relay device, network node, node device, etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

FIG. 1 illustrates a non-limiting example of a wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represent an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

To meet the huge demand for data centric applications, currently 3GPP is discussing extending the current 4G standards to 5G also called as new radio (NR) access. The following are some of the requirements for 5G networks: Data rates of several tens of megabits per second should be supported for tens of thousands of users; 1 gigabit per second to be offered simultaneously to tens of workers on the same office floor; Several hundreds of thousands of simultaneous connections to be supported for massive sensor deployments; Coverage should be improved: Signaling efficiency should be enhanced: and Latency should be reduced significantly compared to LTE.

The multiple input multiple output (MIMO), is an advanced antenna technique to improve the spectral efficiency and thereby boost the overall system capacity. The MIMO technique uses a commonly known notation (M×N) to represent MIMO configuration in terms of the number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit and receive diversity.

MIMO systems can significantly increase the data carrying capacity of wireless systems. MIMO can be used for achieving diversity gain, spatial multiplexing gain and beamforming gain. For these reasons, MIMO is an integral part of the 3rd and 4th generation wireless systems. In addition, massive MIMO systems are currently under investigation for 5G systems.

Figure 2:
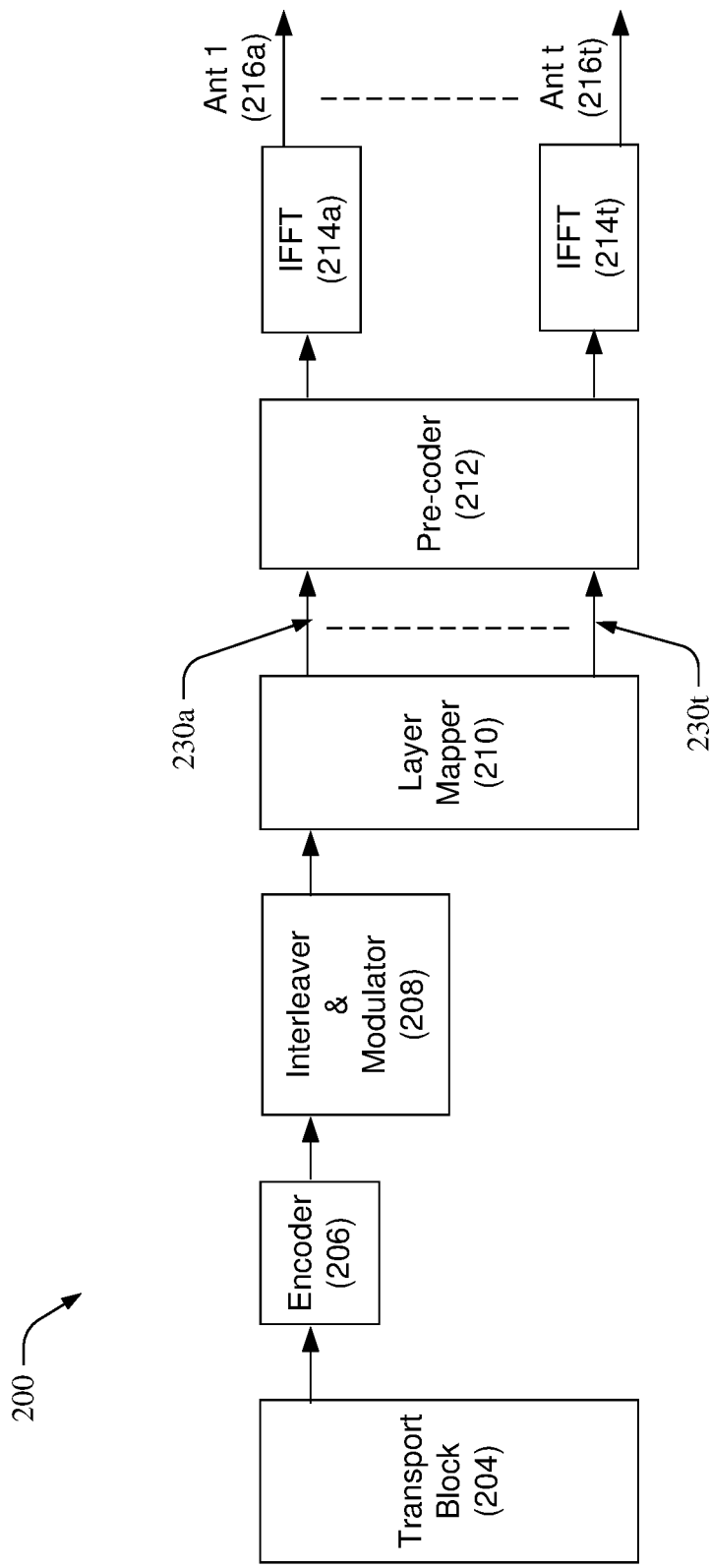
FIG. 2 illustrates a block diagram of uplink MIMO transmitter in accordance with various aspects and embodiments described herein.

FIG. 2, illustrates a block diagram of uplink MIMO transmitter in accordance with various aspects and embodiments described herein. Repetitive description of like elements employed in other embodiments described herein is omitted for sake of brevity. MIMO transmitter comprises a transport block 204, encoder 206, an interleaver/modulator 208, layer mapper 210, pre-coder 212, a group of inverse Fast Fourier Transform (IFFT) processors coupled to group of antennas 216a-t. As illustrated the uplink multi-antenna transmission in 5G systems up to 4 antenna ports (230a-t). Antennas 216a-t or the layer mapping in general, be described as a mapping from the output of the data modulation (e.g., by modulator 208) to the different antenna ports 230a-t. The input to the antenna mapping thus consists of the modulation symbols (QPSK, 16QAM, 64QAM, 256QAM) determined by interleaver and modulator 208 corresponding to the transport block 204. The output of the antenna mapping (e.g., by layer mapper 210) is a set of symbols for each antenna port 230a-t. The symbols of each antenna port are subsequently applied to the OFDM modulator—that is, mapped to the basic OFDM time—frequency grid corresponding to that antenna port.

Figure 3:
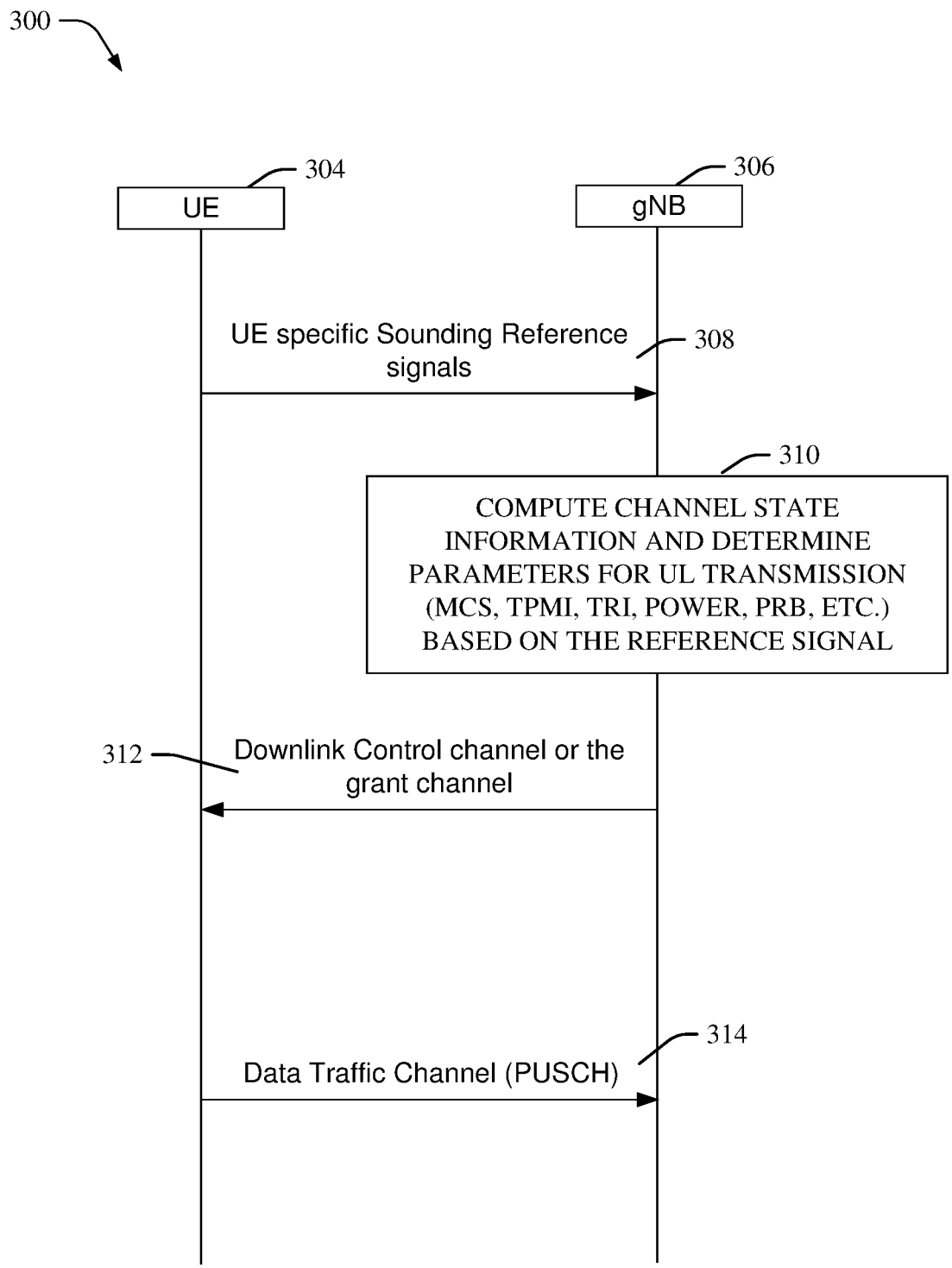
FIG. 3 illustrates a message sequence chart for uplink data transfer in 5G systems in accordance with various aspects and embodiments described herein.

Referring now to FIG. 3, illustrated is a message sequence chart for uplink data transfer in 5G systems 300 in accordance with various aspects and embodiments described herein. Repetitive description of like elements employed in other embodiments described herein is omitted for sake of brevity. In some embodiments, illustrated herein a message sequence chart of an uplink transmission for closed loop MIMO. The UE 304 transmits a message 308 to gNB 306, wherein the message 308 contains a UE specific sounding reference. From the UE specific sounding reference signals, at block 310 the gNB 306 computes/determines the channel estimates then computes the parameters needed for channel-state information (CSI) determination. The determination step consists for example, but not limited to, computing the channel quality indicator (CQI) and/or modulation and coding scheme (MCS), transmit precoding matrix index (TPMI), transmit rank information (TRI), physical resource block (PRB), etc. Once the gNB 306 determines the parameters needed for scheduling uplink data, it will inform these parameters through a grant channel 312 also called downlink control channel information (PDCCH). Once the UE receives this grant information, the UE transmit the uplink data using PUSCH 314.

In some embodiments, the uplink reference signals are predefined signals occupying specific resource elements within the uplink time-frequency grid. There are two types of uplink reference signals that are transmitted in different ways and used for different purposes by the gNB. In some embodiments, the sounding reference signals (SRS) that can be reference signals are specifically intended to be used by gNB to acquire CSI and beam specific information. In 5G systems, the SRS is UE specific, so it can have a significantly lower time/frequency density. The demodulation reference signals (DM-RS or DMRS), can be reference signals that are specifically intended to be used by the gNB for channel estimation for data channel between the gNB and the UE. The label "UE-specific" relates to the fact that each demodulation reference signal is intended for channel estimation by the gNB from a specific UE. That specific reference signal is then only transmitted within the resource blocks assigned for data traffic channel transmission to that UE. Since in general the data is pre-coded, the DM-RS is also pre-coded with the same precoding as that of data.

In some embodiments, the downlink control channel (PDCCH) carries information about the scheduling grants. Typically, this consists of number of MIMO layers scheduled, transport block sizes, modulation for each codeword, parameters related to HARQ, sub band locations etc. Note that all DCI formats may not transmit all the information as shown above. In general, the contents of PDCCH depend on transmission mode and DCI format. In some embodiments, the following information is transmitted by means of the downlink control information (DCI) format:

Carrier indicator
Identifier for DCI formats
UL/SUL indicator
Bandwidth part indicator
Frequency domain resource assignment
Time domain resource assignment
Frequency hopping flag
Modulation and coding scheme
New data indicator
Redundancy version
HARQ process number
Downlink Assignment Index
TPC command for uplink shared channel
SRS resource indicator
TPMI and number of layers
SRS Request
CSI Request
Antenna port(s)
CBG transmission information
PTRS-DMRS association
DMRS sequence initialization
UL-SCH Indicator As mentioned above the network node needs to compute the channel quality and decide about the scheduling parameters for the UE. The network node uses uplink sounding reference signal for computing the channel between the UE and the network. The SRS resource consists of either 1, 2 or 4 consecutive OFDM symbols as configured by the network. The problem is that the SRS needs to be transmitted periodically. This involves lot of overhead and wastage of resources, this in turn reduces the resources allocated for data traffic channel and the current solution is not attractive for eMBB data applications. In addition, with the existing framework for MCS computation involves latency as the UE needs to check the SRS (which can be periodic say every 4/8/10 millisecond (msec)) and compute the channel between the network and the UE and indicate the MCS via scheduling grant. Hence huge delay is involved in indicating the MCS. This huge delay impacts the delay sensitive applications such as ultra-reliable low-latency communication (URLLC). Since URLLC requires low latency, waiting for next SRS would not be feasible.

In some embodiments, a system and a method that facilitates computing/determining the scheduling parameters using the scheduled PUSCH and DMRS is utilized, thereby reducing the overhead for transmitting sounding reference signal that is required for estimating the channel state information. In some embodiments, the network node can configure the UE for transmitting sounding reference signal. In some embodiments, since the UE may be transmitting on PUSCH, the network node can further estimate the channel state information based on the scheduled PUSCH (e.g., information captured during decoding of PUSCH, such as DMRS and signal-to-interference-and-noise ratio (SINR)). In some embodiments, the network node can further estimate the channel state information based on the DMRS. In some embodiments, the network node can further estimate the channel state information based on SINR extracted from PUSCH during the decoding of the PUSCH. In some embodiments, the network node can indicate to the UE the scheduling parameters. The advantage of the method is that significant gains in the sector throughput and cell edge user throughput can be realized as the network obtains the information about the MCS efficiently. Another advantage is that reduction in the signaling overhead for the SRS transmission can be realized. Thus, utilizing these resources for data or control channel transmission improves system capacity significantly.

According to an embodiment, a system can comprise a processor and a memory that stores executable instructions that, when executed by the processor, facilitate performance of operations comprising configuring a device with a periodic rate of specified sounding reference signals with a periodicity using radio resource control signaling. The system can further facilitate estimating channel state information associated with a channel via which the network device communicates. The system can further facilitate transmitting an uplink grant with uplink transmission parameters to set up a physical uplink shared channel, wherein the uplink transmission parameters are determined based on the channel state information. The system can further facilitate estimating scheduling parameters based on a first estimation information associated with the physical uplink shared channel.

According to another embodiment, described herein is a method that can comprise configuring, by a device comprising a processor, a device with a periodic rate of specified sounding reference signals with a periodicity using radio resource control signaling. The method can further comprise estimating, by the device, channel state information. The method can further comprise transmitting, by the device, an uplink grant with uplink transmission parameters to set up an uplink transmission resource, wherein the uplink transmission parameters are determined based on the channel state information. The method can further comprise estimating, by the device, scheduling parameters based on estimation parameters associated with the uplink transmission resource.

According to yet another embodiment, machine-readable storage medium, comprising executable instructions that, when executed by a processor, facilitate performance of operations, configuring a device with a periodic rate of specified sounding reference signals with a periodicity using radio resource control signaling. The machine-readable storage medium can further comprise estimating channel state information associated with a channel via which the network device communicates. The machine-readable storage medium can further comprise transmitting an uplink grant with uplink transmission parameters to set up a physical uplink shared channel, wherein the uplink transmission parameters are determined based on the channel state information. The machine-readable storage medium can further comprise estimating parameters based on a first estimation parameter associated with the physical uplink shared channel.

These and other embodiments or implementations are described in more detail below with reference to the drawings.

Figure 4:
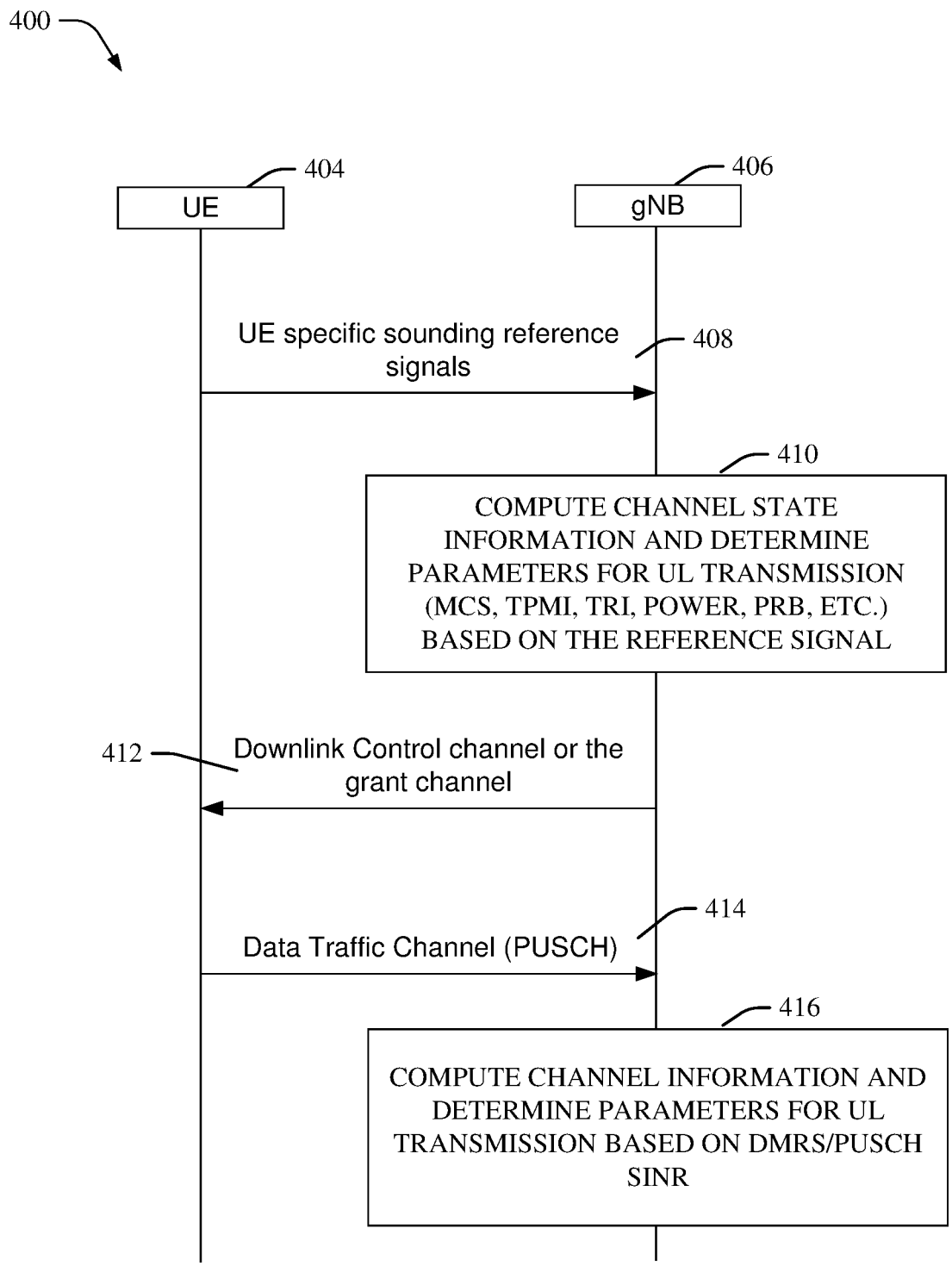
FIG. 4 illustrates an example of a messaging sequence between UE and gNB in accordance with various aspects and embodiments described herein.

Referring now to FIG. 4, illustrated is an example of a messaging sequence 400 between UE and gNB in accordance with various aspects and embodiments described herein. Repetitive description of like elements employed in other embodiments described herein is omitted for sake of brevity. In some embodiments, the UE 404 determines the SRS and transmits the signals 408 to gNB 406. At 410, the gNB uses the SRS to compute/determine channel state information to determine parameters (e.g., MCS, TPMI, TRI, Power, PRB, etc.) for UL transmission. The UE is provided with these parameters through a downlink control channel (e.g., grant channel) at 412. The UE can use the parameters to establish and began using the PUSCH to transmit data. At 414, once the PUSCH is established, the UE can begin transmitting data on the PUSCH. In some embodiments, at 416, the gNB can computer/determine channel information and determine UL parameters by utilizing information available or generated during decoding of PUSCH. For example, DMRS is provided on the scheduled PUSCH. In some embodiments, the gNB can utilize the DMRS to computer UL parameters for UE to use to set up PUSCH without waiting for SRS. In some embodiments, the gNB can capture information determined during decoding of PUSCH, such as, but not limited to, SINR. In some embodiments, the gNB can utilize the SINR to computer UL parameters for UE to use to set up PUSCH without waiting for SRS. Since PUSCH is established and information from the PUSCH can be used to establish PUSCH without requiring SRS, the periodicity of determining and transmitting of SRS can be extended without impacting latency.

In some embodiments, the network estimates the MCS using DMRS (e.g., DMRS based estimation) once it estimates the number of layers and TPMI using SRS. In some embodiments, the network estimates the channel using DMRS for both PUSCH demodulation as well as for MCS computation for the scheduled number of layers and the precoding. Once it estimates the channel, it computes the SINR using the following expression (for minimum mean square error (MMSE) based detector) and computes the MCS:

$$SINR_i = H_i S^{-1} H_i,$$

$$S = N_0 R_N + HH^H - H_i^* H_i^H$$

In the above expression, for each layer SNR is based on rank, wherein "i" is depended on rank, wherein if rank is equal to 1, then "i" is equal to 1. Once the SNR is computed using the above expression, the system can determine MCS. In some embodiments, the MCS is determined by for example, but not limited to, utilizing a lookup table that uses SNR to identify associated MCS. In some embodiments, the network can continuously refresh using the scheduled PUSCH or every time a new PUSCH scheduled for a UE. Thus, UE delays executing SRS producer.

In some embodiments, the network can estimate MCS using PUSCH by evaluating output of MMSE detector. Using the output, SNR can be determined. Once the SNR is determined, the MCS table can be utilized to estimate MCS.

In some embodiment, if a failure is detected on any packets, the gNB can use previous information based on SNR and estimate MCS. In some embodiments, when a packet failure occurs, the network utilizes the DMRS based estimation to estimate MCS. In some embodiments, when a packet failure occurs, the network utilizes the PUSCH based method to estimate MCS.

Figure 5A:
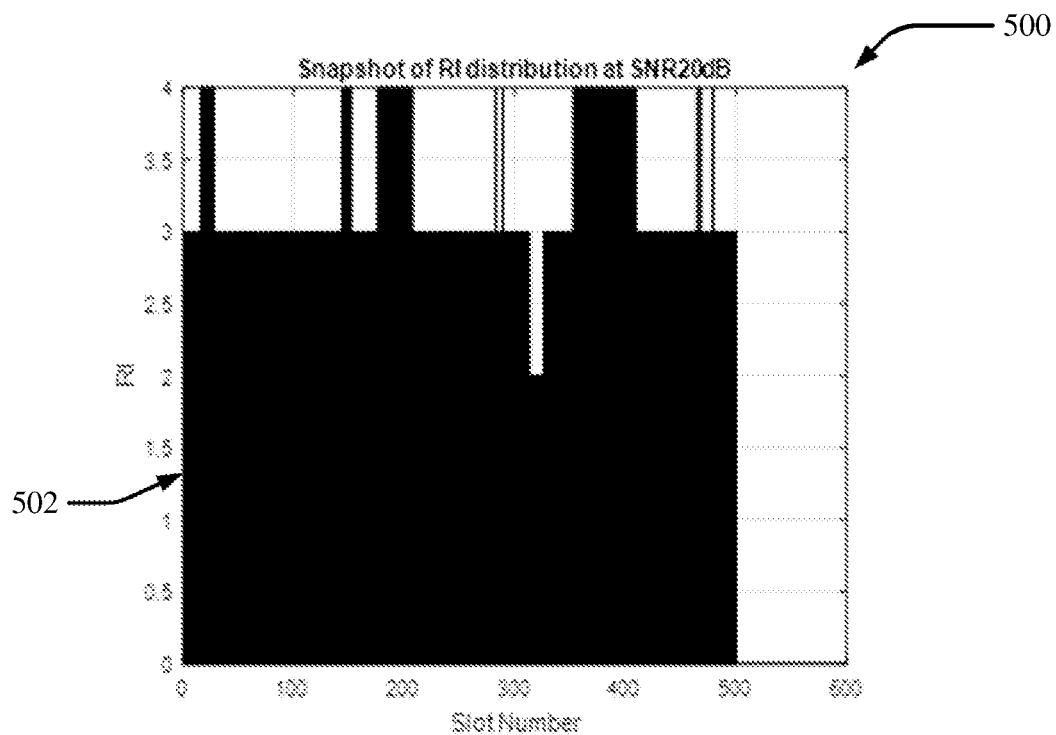
FIG. 5A illustrates an example of rank information (RI) distribution in accordance with various aspects and embodiments described herein.

Referring now to FIG. 5A, illustrated is an example of rank information (RI) distribution 500 in accordance with various aspects and embodiments described herein. Repetitive description of like elements employed in other embodiments described herein is omitted for sake of brevity. As illustrated by 502, the RI does not change over majority of the bandwidth. This will allow gNB to use information from PUSCH to estimate scheduling parameters.

Figure 5B:
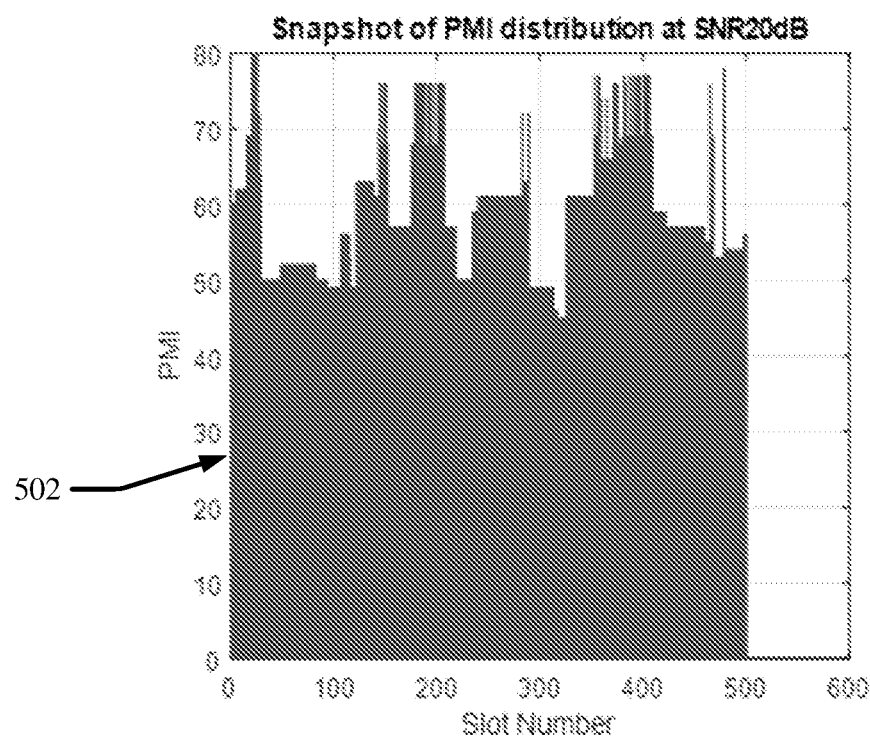
FIG. 5B illustrates an example of pre-coding matrix index (PMI) distribution in accordance with various aspects and embodiments described herein.

Referring now to FIG. 5B, illustrated is an example of pre-coding matrix index (PMI) distribution 550 in accordance with various aspects and embodiments described herein. Repetitive description of like elements employed in other embodiments described herein is omitted for sake of brevity. As illustrated by 502, the PMI does not change over majority of the bandwidth. This will allow gNB to use information from PUSCH to estimate scheduling parameters.

In some embodiments, the network can increase the periodicity (UE providing SRS) from, for example from 4/8/10 msec period to 100+ msec period, and use PUSCH to estimate scheduling parameters (e.g., MCS) using DMRS or PUSCH based channel estimation or SINR. The advantage is that the network can save significant resources by not having to generate SRS frequently. The saved resources can be used for other physical channels or signaling.

Figure 6:
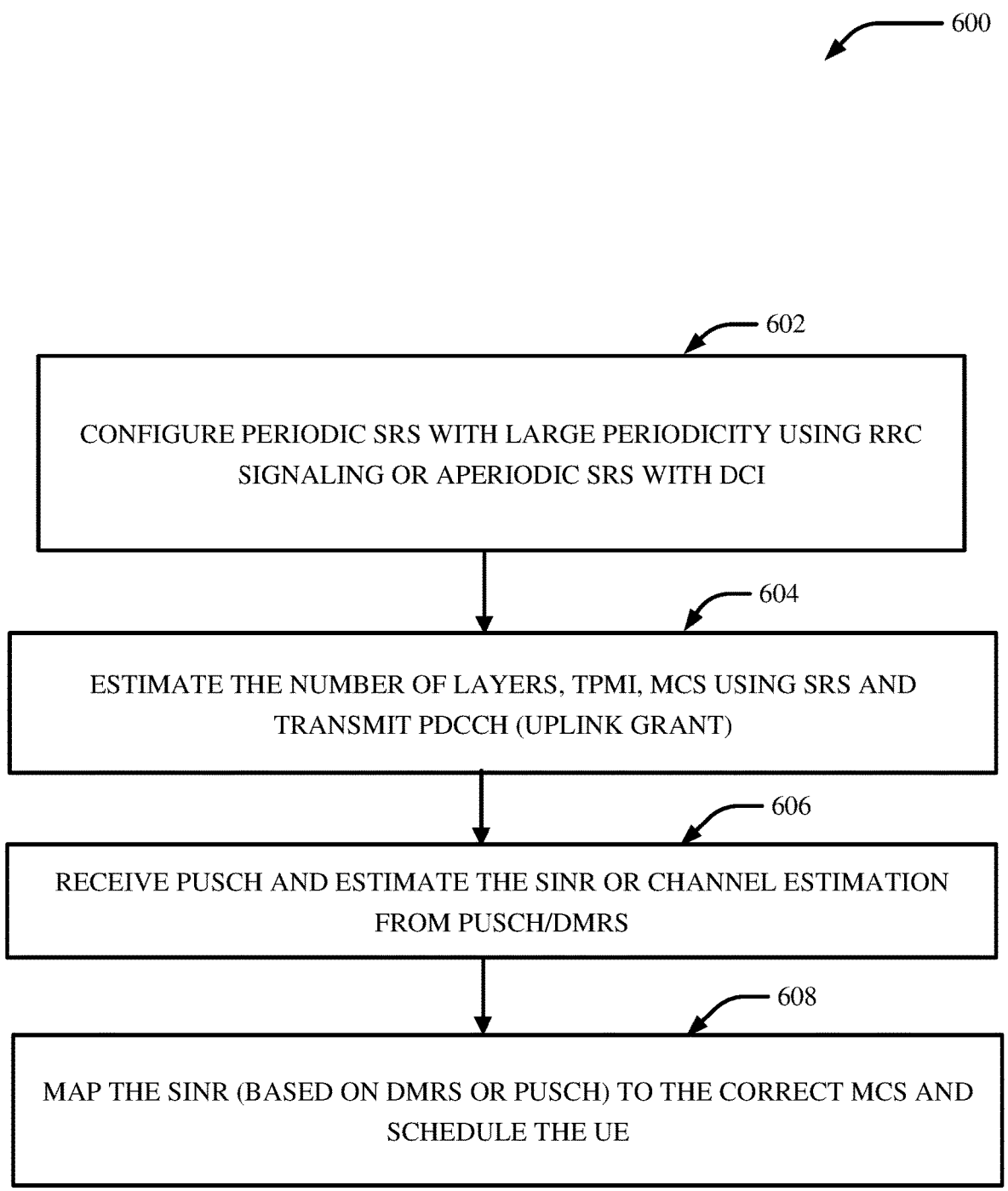
FIG. 6 illustrates a block diagram of non-limiting example of method that facilitates scheduling of uplink data using demodulation reference signal and scheduled resources in accordance with various aspects and embodiments described herein.

Referring now to FIG. 6, illustrated is a block diagram of non-limiting example of method that facilitates scheduling of uplink data using demodulation reference signal and scheduled resources in accordance with various aspects and embodiments described herein. Repetitive description of like elements employed in other embodiments described herein is omitted for sake of brevity. Block 602 depicts configuration of SRS with large periodicity (e.g., 100 msec period) using radio resource control signaling (RRC) or aperiodic SRS with downlink control information (DCI). Block 604 depicts estimating uplink transmission parameter, for example, the number of layers, TPMI and MCS using SRS, transmitting the PDCCH to the UE (e.g., uplink grant). Block 606 depicts receiving PUSCH and estimating the SINR, channel estimate from PUSCH or DMRS (estimating channel state information associated with a channel via which the network device communicates using one or of estimation information, such as the SINR, channel estimate from PUSCH or DMRS). Block 608 depicts mapping the SINR (based on DMRS or PUSCH) to correct/update MCS and schedule the UE.

Figure 7:
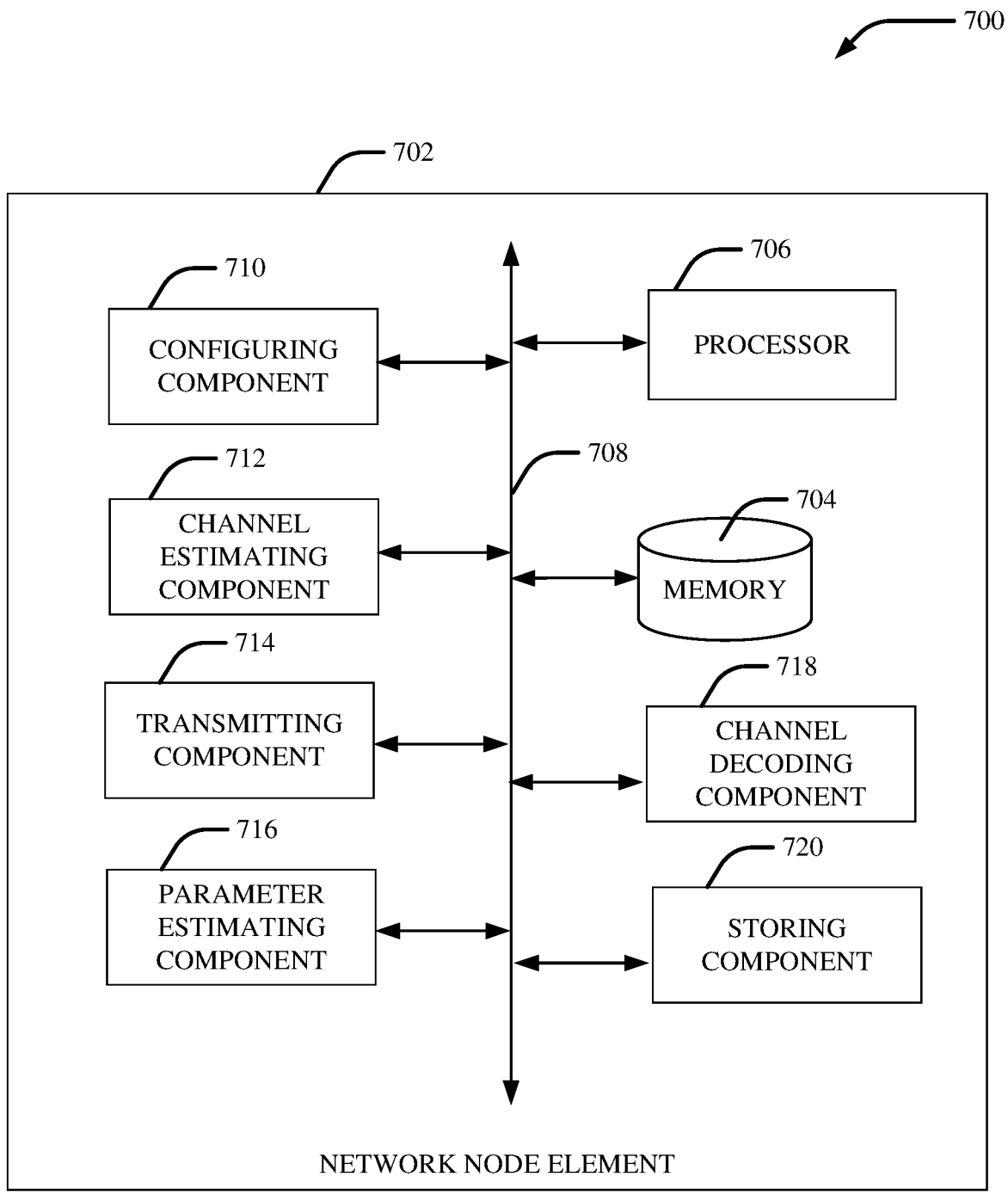
FIG. 7 illustrates a block diagram of non-limiting example of components that facilitates scheduling of uplink data using demodulation reference signal and scheduled resources in accordance with various aspects and embodiments described herein.

FIG. 7 illustrates a block diagram of an example, non-limiting system 700 that facilitates scheduling of uplink data using scheduled resources in accordance with one or more embodiments described herein. Repetitive description of like elements employed in respective embodiments is omitted for sake of brevity. According to some embodiments, the system 700 can comprise a network node device 702. In some embodiments, the network node device 702 can also include or otherwise be associated with a memory 704, a processor 706 that executes computer executable components stored in a memory 704. The network node device 702 can further include a system bus 708 that can couple various components including, but not limited to, a configuring component 710, a channel estimating component 712, and a transmitting component 714, parameter estimating component 716, a channel decoding component 718 and a storing component 720.

Aspects of systems (e.g., the network node device 702 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

It should be appreciated that the embodiments of the subject disclosure depicted in various figures disclosed herein are for illustration only, and as such, the architecture of such embodiments are not limited to the systems, devices, and/or components depicted therein. For example, in some embodiments, the network node device 702 can comprise various computer and/or computing-based elements described herein with reference to operating environment 1100 and FIG. 11. In several embodiments, such computer and/or computing-based elements can be used in connection with implementing one or more of the systems, devices, and/or components shown and described in connection with FIG. 7 or other figures disclosed herein.

According to several embodiments, the memory 704 can store one or more computer and/or machine readable, writable, and/or executable components and/or instructions that, when executed by processor 706, can facilitate performance of operations defined by the executable component(s) and/or instruction(s). For example, the memory 704 can store computer and/or machine readable, writable, and/or executable components and/or instructions that, when executed by the processor 706, can facilitate execution of the various functions described herein relating to the configuring component 710, the channel estimating component 712, the transmitting component 714, the parameter estimating component 716, the channel decoding component 718 and the storing component 720.

In several embodiments, the memory 704 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 704 are described below with reference to system memory 1106 and FIG. 11. Such examples of memory 704 can be employed to implement any embodiments of the subject disclosure.

According to some embodiments, the processor 706 can comprise one or more types of processors and/or electronic circuitry that can implement one or more computer and/or machine readable, writable, and/or executable components and/or instructions that can be stored on the memory 704. For example, the processor 706 can perform various operations that can be specified by such computer and/or machine readable, writable, and/or executable components and/or instructions including, but not limited to, logic, control, input/output (I/O), arithmetic, and/or the like. In some embodiments, processor 706 can comprise one or more central processing unit, multi-core processor, microprocessor, dual microprocessors, microcontroller, System on a Chip (SOC), array processor, vector processor, and/or another type of processor.

In some embodiments, the processor 706, the memory 704, the configuring component 710, the channel estimating component 712, the transmitting component 714, the parameter estimating component 716, the channel decoding component 718 and the storing component 720 can be communicatively, electrically, and/or operatively coupled to one another via the system bus 708 to perform functions of the network node device 702, and/or any components coupled therewith. In several embodiments, the system bus 708 can comprise one or more memory bus, memory controller, peripheral bus, external bus, local bus, and/or another type of bus that can employ various bus architectures.

In several embodiments, the network node device 702 can comprise one or more computer and/or machine readable, writable, and/or executable components and/or instructions that, when executed by the processor 706, can facilitate performance of operations defined by such component(s) and/or instruction(s). Further, in numerous embodiments, any component associated with the network node device 702, as described herein with or without reference to the various figures of the subject disclosure, can comprise one or more computer and/or machine readable, writable, and/or executable components and/or instructions that, when executed by the processor 706, can facilitate performance of operations defined by such component(s) and/or instruction(s). For example, the configuring component 710, and/or any other components associated with the network node device 702 (e.g., communicatively, electronically, and/ or operatively coupled with and/or employed by network node device 702), can comprise such computer and/or machine readable, writable, and/or executable component(s) and/or instruction(s). Consequently, according to numerous embodiments, the network node device 702 and/or any components associated therewith, can employ the processor 706 to execute such computer and/or machine readable, writable, and/or executable component(s) and/or instruction(s) to facilitate performance of one or more operations described herein with reference to the network node device 702 and/or any such components associated therewith.

In some embodiments, the network node device 702 can facilitate performance of operations related to and/or executed by the components of network node device 702, for example, the processor 706, the memory 704, the configuring component 710, the channel estimating component 712, the transmitting component 714, the parameter estimating component 716, the channel decoding component 718 and the storing component 720. For example, as described in detail below, the network node device 702 can facilitate: configuring (e.g., by the configuring component 710) a network device with a periodic rate of specified sounding reference signals with a periodicity using radio resource control signaling; estimating (e.g., by the channel estimating component 712) channel state information associated with a channel via which the network device communicates; transmitting (e.g., by the transmitting component 714) an uplink grant with uplink transmission parameters to set up a physical uplink shared channel, wherein the uplink transmission parameters are determined based on the channel state information; and estimating (e.g., by the parameter estimating component 716) scheduling parameters based on a first estimation information associated with the physical uplink shared channel. The network node device 702 can further facilitate decoding (e.g., by the channel decoding component 718) data received on the physical uplink shared channel to determine the first estimation information and to estimate a modulation and coding scheme; and storing (e.g., by the storing component 720) a second estimation information received on the physical uplink shared channel, wherein the second estimation information comprises demodulation reference signals.

In some embodiments, the device and the configuring component 710 can comprise one or more processors, memory, and electrical circuitry. In some embodiments, the configuring component 710 can comprise configuring a network device with a periodic rate of specified sounding reference (SRS) signals with a periodicity using radio resource control signaling. In some embodiments, the network node 702 configures the network device (e.g., the UE) to periodically transmit the SRS. The network node 702 uses the SRS to compute the channel quality and decide about the scheduling parameters for the UE and uses uplink SRS for computing the channel between the UE and the network.

In some embodiments, the channel estimating component 712, can comprise one or more processors, memory, and electrical circuitry. In some embodiments, the channel estimating component 712 can comprise estimating channel state information associated with a channel via which the network device communicates. In some embodiments, since the UE can transmit on PUSCH, the network node can further estimate the channel state information based on the scheduled PUSCH (e.g., information captured during decoding of PUSCH, such as DMRS and signal-to-interference-and-noise ratio (SINR or SNR)). The advantage of using the PUSCH to estimate channel state information versus using the SINR data is that the network node can increase the number of times the channel state information is estimated, because the PUSCH is transmitted more frequently than the SINR.

In some embodiments, the transmitting component 714 can comprise one or more processors, memory, and electrical circuitry. In some embodiments, the transmitting component 714 can comprise transmitting an uplink grant with uplink transmission parameters to set up a physical uplink shared channel, wherein the uplink transmission parameters are determined based on the channel state information. In some embodiments, upon determining the uplink transmission parameters, the network node 702 employing a physical downlink control channel transmits the uplink transmission parameter to the specific UE. The uplink parameters are based on the estimated channel state information. For example, the channel state information comprise, but not limited to, computing the channel quality indicator (CQI) and/or modulation and coding scheme (MCS), transmit precoding matrix index (TPMI), transmit rank information (TRI), physical resource block (PRB), etc. Once the network node 702 determines the parameters needed for scheduling uplink resources for a specific network device, the network node 702 will inform these parameters through a grant channel 712 (e.g., downlink control channel information or PDCCH). Once the UE receives this grant information, the network device transmits the uplink data using PUSCH.

In some embodiments, the parameter estimating component 716 can comprise one or more processors, memory, and electrical circuitry. In some embodiments, the parameter estimating component 716 can comprise estimating scheduling parameters based on a first estimation information associated with the physical uplink shared channel. In some embodiments, the network node 702 can further estimate the channel state information based on the scheduled PUSCH (e.g., information captured during decoding of PUSCH, such as DMRS and signal-to-interference-and-noise ratio (SINR)). In some embodiments, the network node can further estimate the channel state information based on the DMRS. In some embodiments, the network node can further estimate the channel state information based on SINR extracted from PUSCH during the decoding of the PUSCH.

In some embodiments, the channel decoding component 718 can comprise one or more processors, memory, and electrical circuitry. In some embodiments, the channel decoding component 718 can comprise decoding data received on the physical uplink shared channel to determine the first estimation information and to estimate a modulation and coding scheme. In some embodiments, the PUSCH is decoded to extract information transmitted by the UE. In some embodiments, the DMRS (e.g. the first estimation information) is included in the PUSCH that can be used for estimating scheduled parameters. In some embodiments, the SNIR information (e.g., the first information) is extracted upon decoding the PUSCH and used for estimated scheduled parameters.

In some embodiments, the storing component 720 can comprise one or more processors, memory, and electrical circuitry. In some embodiments, the storing component 720 can comprise storing a second estimation information received on the physical uplink shared channel, wherein the second estimation information comprises demodulation reference signals. In some embodiments, the DMRS information and/or the SINR information (e.g., either may be the second estimation information depending the information used for estimating scheduling parameters) is stored in memory 704 the event of an uplink failure. In some embodiments, if network node 702 is not able to decode the current PUSCH (e.g., failure), the network node 702 can employ the stored information to estimate scheduling parameters without waiting for SRS data (e.g., the data that is transmitted periodically). The advantage of storing information is that during failures, the system can utilize older, but not outdated, data to estimate scheduling parameters. In some embodiments, the network node may transmit an indication to the network device to request uplink recourse using the stored information (e.g., either DMRS information and/or the SINR information) or may provide new DMRS information and/or the SINR information.

Figure 8:
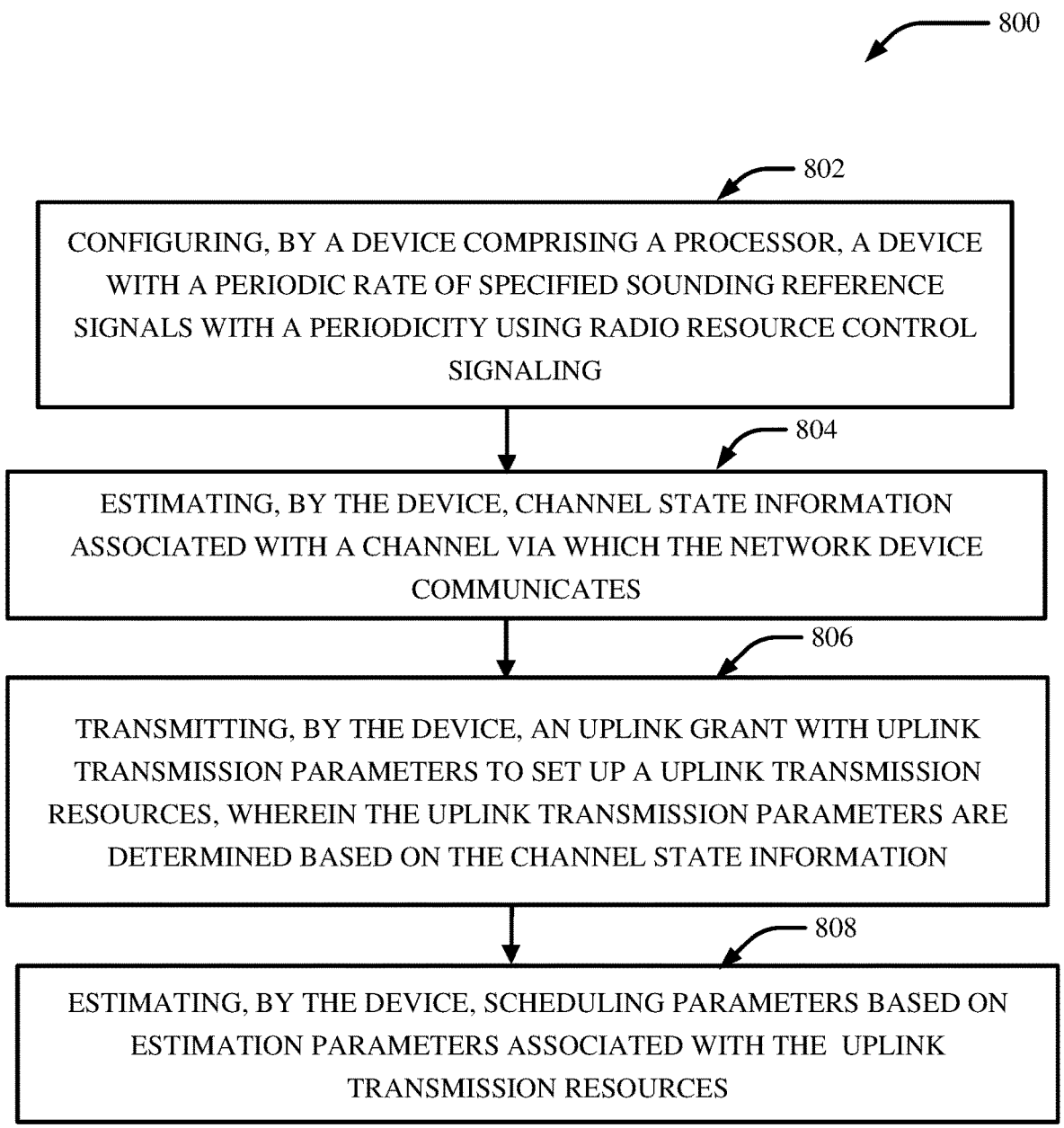
FIG. 8 illustrates a diagram of an example, non-limiting computer implemented method that facilitates scheduling of uplink data using demodulation reference signal and scheduled resources system in accordance with one or more embodiments described herein.

FIG. 8 depicts a diagram of an example, non-limiting computer implemented method that facilitates scheduling of uplink data using demodulation reference signal and scheduled resources system in accordance with one or more embodiments described herein. Repetitive description of like elements employed in other embodiments described herein is omitted for sake of brevity. In some examples, flow diagram 800 can be implemented by operating environment 1100 described below. It can be appreciated that the operations of flow diagram 800 can be implemented in a different order than is depicted.

In non-limiting example embodiments, a computing device (or system) (e.g., computer 1104) is provided, the device or system comprising one or more processors and one or more memories that stores executable instructions that, when executed by the one or more processors, can facilitate performance of the operations as described herein, including the non-limiting methods as illustrated in the flow diagrams of FIG. 8.

Operation 802 depicts configuring, by a device comprising a processor, a device with a periodic rate of specified sounding reference signals with a periodicity using radio resource control signaling. Operation 804 depicts estimating, by the device, channel state information. Operation 806 depicts transmitting, by the device, an uplink grant with uplink transmission parameters to set up an uplink transmission resource (e.g., physical uplink shared channel), wherein the uplink transmission parameters are determined based on the channel state information. Operation 808 depicts estimating, by the device, scheduling parameters based on estimation parameters associated with the uplink transmission resource.

Figure 9:
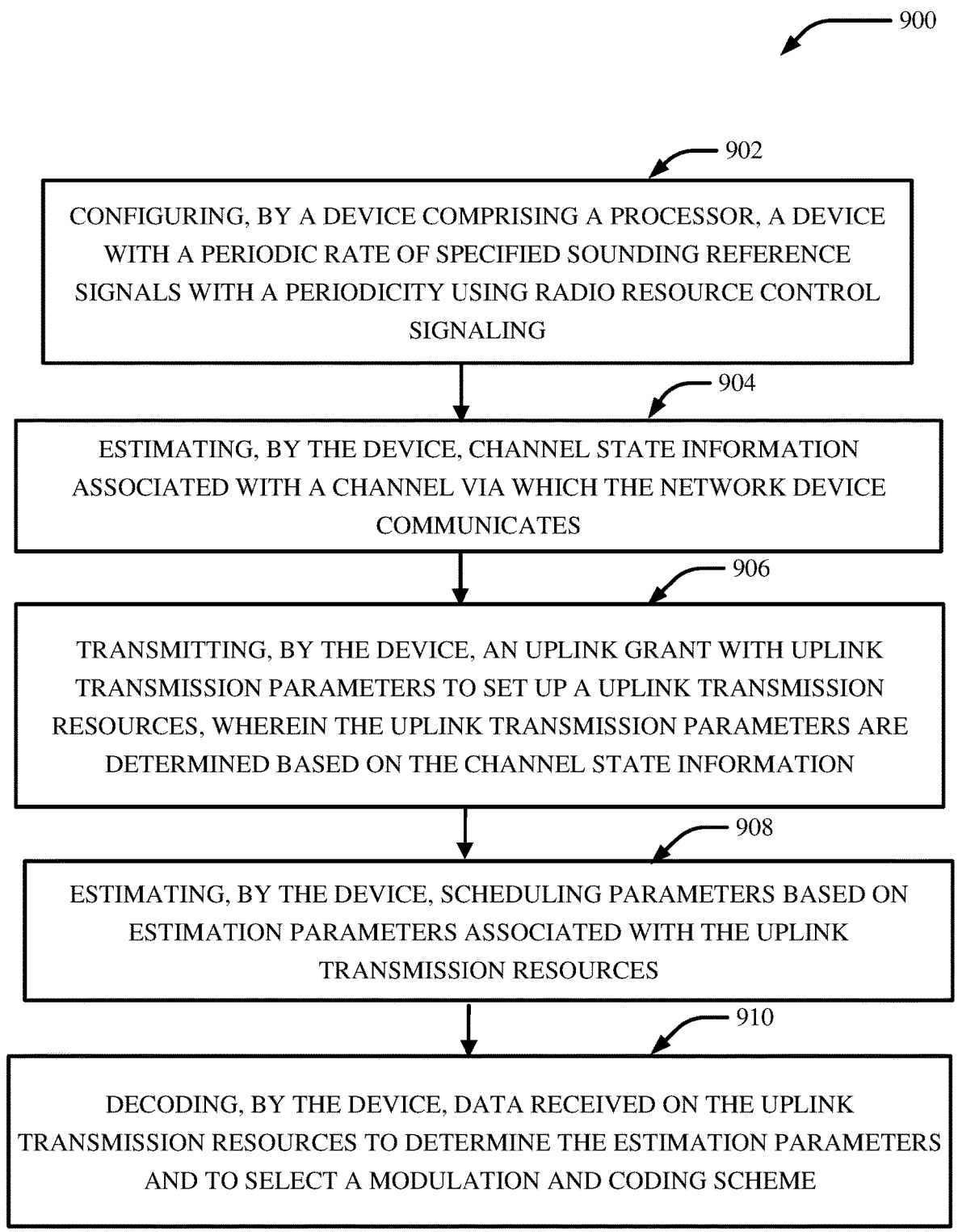
FIG. 9 depicts a diagram of an example, non-limiting computer implemented method that facilitates scheduling of uplink data using demodulation reference signal and scheduled resources system in accordance with one or more embodiments described herein.

FIG. 9 depicts a diagram of an example, non-limiting computer implemented method that facilitates scheduling of uplink data using demodulation reference signal and scheduled resources system in accordance with one or more embodiments described herein. Repetitive description of like elements employed in other embodiments described herein is omitted for sake of brevity. In some examples, flow diagram 900 can be implemented by operating environment 1100 described below. It can be appreciated that the operations of flow diagram 900 can be implemented in a different order than is depicted.

In non-limiting example embodiments, a computing device (or system) (e.g., computer 1104) is provided, the device or system comprising one or more processors and one or more memories that stores executable instructions that, when executed by the one or more processors, can facilitate performance of the operations as described herein, including the non-limiting methods as illustrated in the flow diagrams of FIG. 9.

Operation 902 depicts configuring, by a device comprising a processor, a device with a periodic rate of specified sounding reference signals with a periodicity using radio resource control signaling. Operation 904 depicts estimating, by the device, channel state information. Operation 906 depicts transmitting, by the device, an uplink grant with uplink transmission parameters to set up an uplink transmission resource, wherein the uplink transmission parameters are determined based on the channel state information. Operation 908 depicts estimating, by the device, scheduling parameters based on estimation parameters associated with the uplink transmission resource. Operation 910 depicts decoding, by the device, data received on the uplink transmission resource to determine the estimation parameters and to select a modulation and coding scheme.

Figure 10:
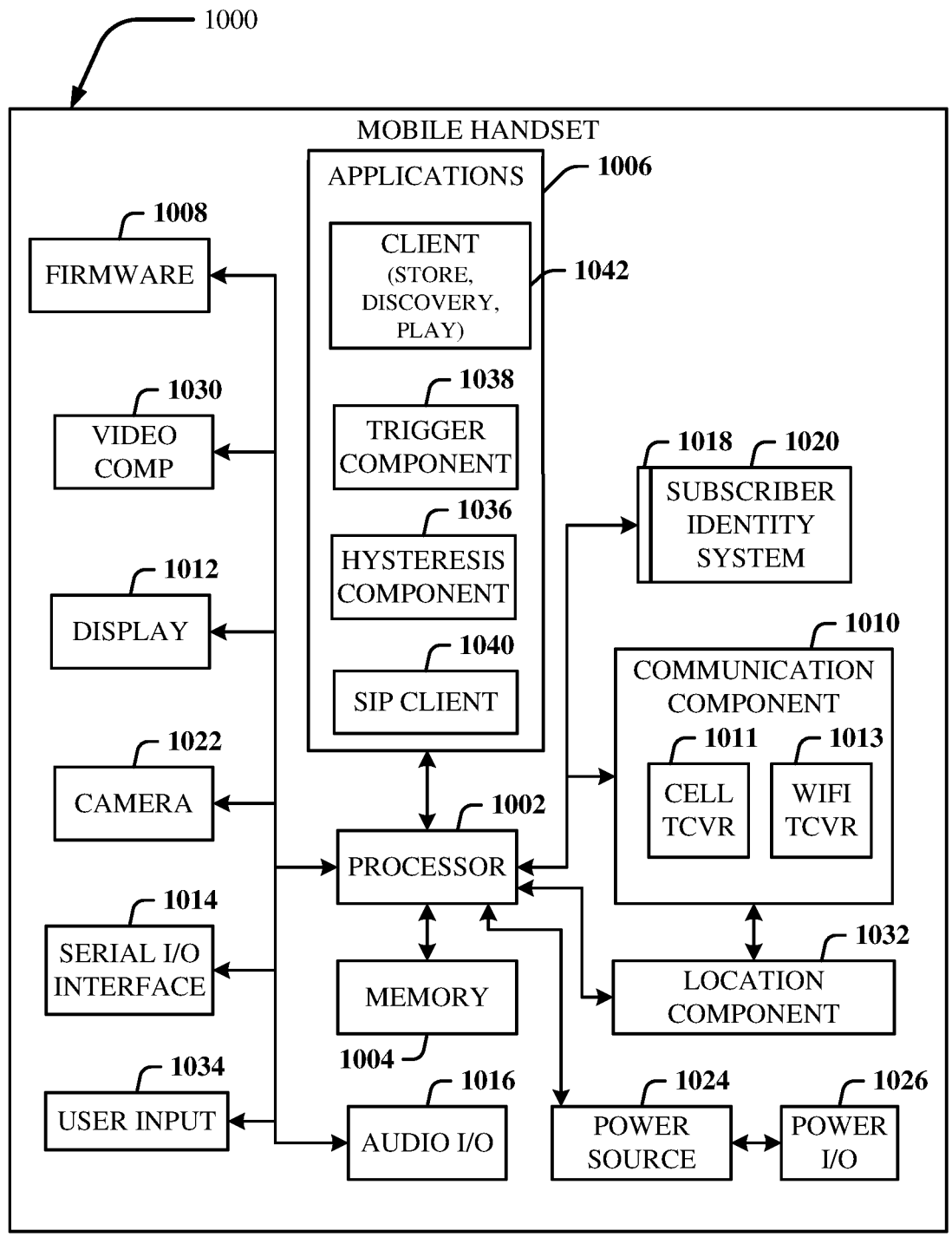
FIG. 10 illustrates an example block diagram of an example mobile handset operable to engage in a system architecture that facilitates wireless communications according to one or more embodiments described herein.

Referring now to FIG. 10, illustrated is an example block diagram of an example mobile handset 1000 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1394) through a hardwire connection, and other serial input devices (e.g., a keyboard, keypad, and mouse). This can support updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communications component 1010 to accommodate IP traffic from an IP network such as, for example, the Internet, a corporate intranet, a home network, a person area network, etc., through an ISP or broadband cable provider. Thus, VoIP traffic can be utilized by the handset 1000 and IP-based multimedia content can be received in either an encoded or decoded format.

A video processing component 1022 (e.g., a camera) can be provided for decoding encoded multimedia content. The video processing component 1022 can aid in facilitating the generation, editing, and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touchscreen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
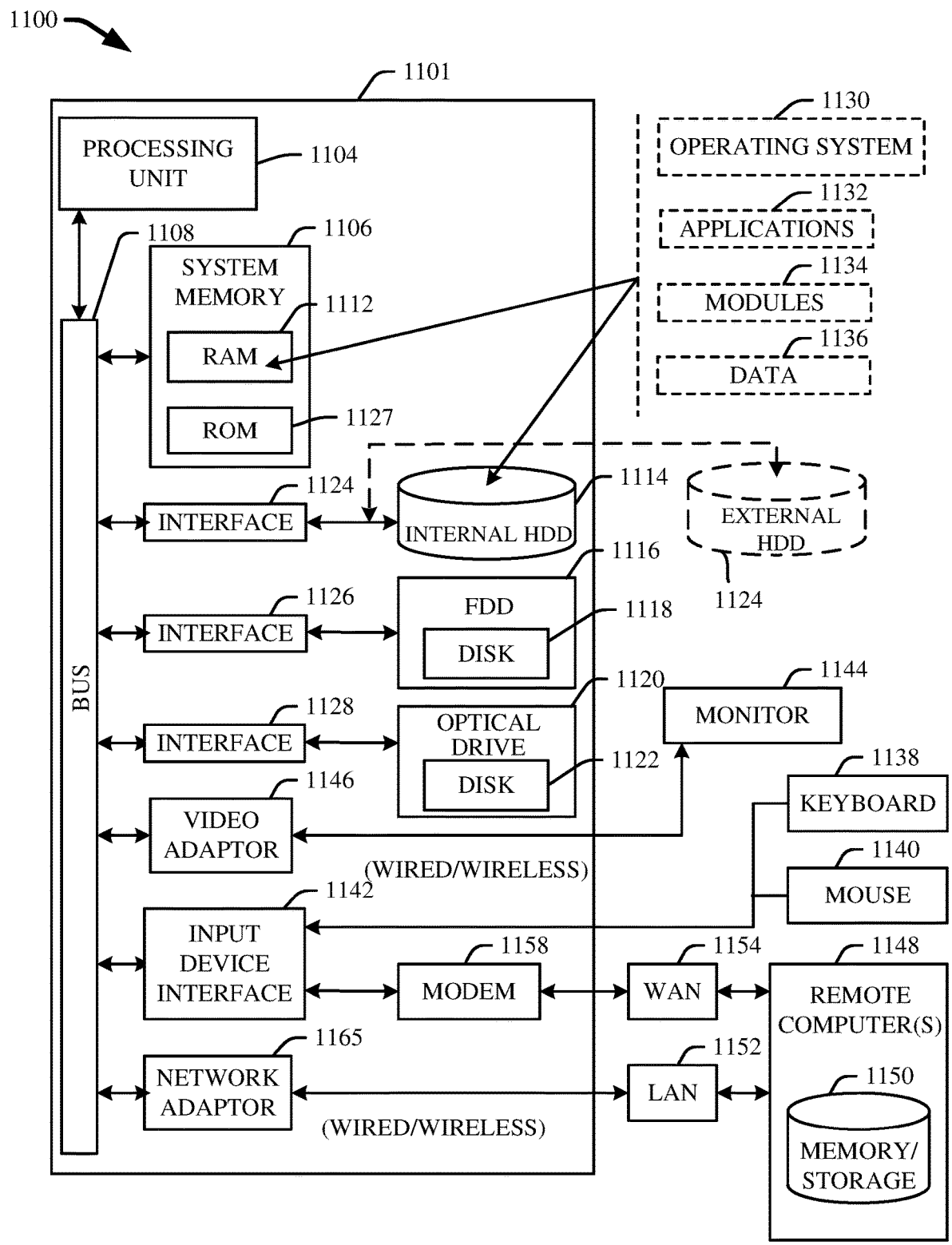
FIG. 11 illustrates an example block diagram of an example computer operable to engage in a system architecture that facilitates wireless communications according to one or more embodiments described herein.

Referring now to FIG. 11, illustrated is an example block diagram of an example computer 1100 operable to engage in a system architecture that facilitates wireless communications according to one or more embodiments described herein. The computer 1100 can provide networking and communication capabilities between a wired or wireless communication network and a server (e.g., Microsoft server) and/or communication device. In order to provide additional context for various aspects thereof, FIG. 11 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general-purpose computing mechanism described below with reference to FIG. 11 is but one example of a computing device.

In order to provide a context for the various aspects of the disclosed subject matter, FIG. 11 and the following discussion, are intended to provide a brief, general description of a suitable environment in which the various aspects of the disclosed subject matter can be implemented. While the subject matter has been described above in the general context of computer-executable instructions of a computer program that runs on a computer and/or computer, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1120 (see below), non-volatile memory 1122 (see below), disk storage 1124 (see below), and memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with an embodiment. Computer 1100, which can be, for example, part of the hardware of system 1120, includes a processing unit 1114, a system memory 1106, and a system bus 1118. System bus 1118 couples system components including, but not limited to, system memory 1106 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1106 can include volatile memory 1120 and nonvolatile memory 1122. A basic input/output system (BIOS), containing routines to transfer information between elements within computer 1100, such as during start-up, can be stored in nonvolatile memory 1122. By way of illustration, and not limitation, nonvolatile memory 1122 can include ROM 1127, PROM, EPROM, EEPROM, or flash memory. Volatile memory 1120 includes RAM 1112, which acts as external cache memory. By way of illustration and not limitation, RAM 1112 is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1100 can also include removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software includes an operating system 1128. Operating system 1128, which can be stored on disk storage 1124, acts to control and allocate resources of computer 1100. System applications 1130 take advantage of the management of resources by operating system 1128 through program modules 1132 and program data 1134 stored either in system memory 1106 or on disk storage 1124. It is to be noted that the disclosed subject matter can be implemented with various operating systems or combinations of operating systems.

A user can enter commands or information into computer 1100 through input device(s) 1136. As an example, a mobile device and/or portable device can include a user interface embodied in a touch sensitive display panel allowing a user to interact with computer 1100. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 include, for example, a serial port, a parallel port, a game port, a universal serial bus (USB), an infrared port, a Bluetooth port, an IP port, or a logical port associated with a wireless service, etc. Output device(s) 1140 and a move use some of the same type of ports as input device(s) 1136.

Thus, for example, a USB port can be used to provide input to computer 1100 and to output information from computer 1100 to an output device 1140. Output adapter 1142 is provided to illustrate that there are some output devices 1140 like monitors, speakers, and printers, among other output devices 1140, which use special adapters. Output adapters 1142 include, by way of illustration and not limitation, video and sound cards that provide means of connection between output device 1140 and system bus 1118. It should be noted that other devices and/or systems of devices provide both input and output capabilities such as remote computer(s) 1144.

Computer 1100 can operate in a networked environment using logical connections to one or more remote computers, such as remote computer(s) 1144. Remote computer(s) 1144 can be a personal computer, a server, a router, a network PC, cloud storage, cloud service, a workstation, a microprocessor based appliance, a peer device, or other common network node and the like, and typically includes many or all of the elements described relative to computer 1100.

For purposes of brevity, only a memory storage device 1146 is illustrated with remote computer(s) 1144. Remote computer(s) 1144 is logically connected to computer 1100 through a network interface 1148 and then physically connected by way of communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1100, it can also be external to computer 1100. The hardware/software for connection to network interface 1148 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," "relay device," "node," "point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

Performing aggregation above the RLC makes it possible to perform the routing and aggregation at the same protocol sublayer. Thus, additional possibilities in terms of taking into account routing information while performing bearer aggregation can be used to facilitate a more efficient system. Additionally, it also reduces the impact on standards for lower protocol stack layers. Similarly, the benefits of performing aggregation below the RLC are that it can reduce the demand for LCID space extension when trying to support 1:1 mapping of UE bearers to backhaul channels.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
transmitting, by network equipment comprising a processor, to a user equipment, first scheduling parameters for a physical uplink shared channel, wherein the first scheduling parameters are based on first channel state information estimated based on sounding reference signals received from the user equipment based on a first periodicity applicable to transmission of the sounding reference signals; and
in response to identifying, based on second channel state information estimated based on data received from the user equipment via the physical uplink shared channel, that second scheduling parameters for the physical uplink shared channel are able to be determined prior to subsequent sounding reference signals being transmitted by the user equipment based on the first periodicity, transmitting, by the network equipment, to the user equipment, a message that configures the user equipment to employ a second periodicity applicable to transmission of the subsequent sounding reference signals that is longer than the first periodicity.

2. The method of claim 1, further comprising determining, by the network equipment, the second scheduling parameters for the physical uplink shared channel based on second channel state information estimated based on the data received from the user equipment via the physical uplink shared channel.

3. The method of claim 2, further comprising transmitting, by the network equipment, to the user equipment, the second scheduling parameters for the physical uplink shared channel.

4. The method of claim 2, wherein determining the second scheduling parameters comprises determining signal-to-interference-and-noise information based on the data received from the user equipment via the physical uplink shared channel.

5. The method of claim 4, wherein determining the second scheduling parameters further comprises determining the second scheduling parameters based on the signal-to-interference-and-noise information.

6. The method of claim 2, wherein determining the second scheduling parameters comprises determining demodulation reference signal information based on the data received from the user equipment via the physical uplink shared channel.

7. The method of claim 6, wherein determining the second scheduling parameters further comprises determining the second scheduling parameters based on the demodulation reference signal information.

8. Network equipment, comprising:
a processor; and
a memory that stores executable instructions that, when executed by the processor, facilitate performance of operations, comprising:
sending, to a user equipment, first scheduling parameters for a physical uplink shared channel, wherein the first scheduling parameters are based on first channel state information estimated based on sounding reference signals received from the user equipment based on a first periodicity for transmission of the sounding reference signals; and
in response to identifying that second scheduling parameters for the physical uplink shared channel, based on second channel state information estimated based on data received from the user equipment on the physical uplink shared channel, are able to be determined prior to subsequent sounding reference signals being transmitted by the user equipment based on the first periodicity, sending, to the user equipment, a communication that configures the user equipment to employ a second periodicity for transmission of the subsequent sounding reference signals that is longer than the first periodicity.

9. The network equipment of claim 8, wherein the operations further comprise determining the second scheduling parameters for the physical uplink shared channel based on second channel state information estimated based on the data received from the user equipment on the physical uplink shared channel.

10. The network equipment of claim 9, wherein the operations further comprise communicating, to the user equipment, the second scheduling parameters for the physical uplink shared channel.

11. The network equipment of claim 9, wherein determining the second scheduling parameters comprises determining signal-to-interference-and-noise information based on the data received from the user equipment on the physical uplink shared channel.

12. The network equipment of claim 11, wherein determining the second scheduling parameters comprises determining the second scheduling parameters based on the signal-to-interference-and-noise information.

13. The network equipment of claim 9, wherein determining the second scheduling parameters comprises determining demodulation reference signal information based on the data received from the user equipment on the physical uplink shared channel.

14. The network equipment of claim 13, wherein determining the second scheduling parameters comprises determining the second scheduling parameters based on the demodulation reference signal information.

15. A non-transitory machine-readable medium, comprising executable instructions that, when executed by a processor of network equipment, facilitate performance of operations, comprising:
communicating, to a user equipment, first scheduling parameters applicable to a physical uplink shared channel, wherein the first scheduling parameters are based on first channel state information estimated based on sounding reference signals received from the user equipment based on a first periodicity for the sounding reference signals; and
in response to identifying, based on second channel state information estimated based on data received from the user equipment via the physical uplink shared channel, that second scheduling parameters applicable to the physical uplink shared channel are able to be determined prior to subsequent sounding reference signals being transmitted by the user equipment based on the first periodicity, communicating, to the user equipment, an instruction that configures the user equipment to employ a second periodicity for the subsequent sounding reference signals that is longer than the first periodicity.

16. The non-transitory machine-readable medium of claim 15, wherein the operations further comprise determining the second scheduling parameters applicable to the physical uplink shared channel based on second channel state information estimated based on the data received from the user equipment via the physical uplink shared channel.

17. The non-transitory machine-readable medium of claim 16, wherein the operations further comprise sending, to the user equipment, the second scheduling parameters applicable to the physical uplink shared channel.

18. The non-transitory machine-readable medium of claim 16, wherein determining the second scheduling parameters comprises determining signal-to-interference-and-noise information based on the data received from the user equipment via the physical uplink shared channel.

19. The non-transitory machine-readable medium of claim 18, wherein determining the second scheduling parameters comprises determining the second scheduling parameters based on the signal-to-interference-and-noise information.

20. The non-transitory machine-readable medium of claim 16, wherein determining the second scheduling parameters comprises determining demodulation reference signal information based on the data received from the user equipment via the physical uplink shared channel, and determining the second scheduling parameters based on the demodulation reference signal information.

* * * * *